United States Patent Office 3,103,504
Patented Sept. 10, 1963

3,103,504
DICHLOROTRIAZINES STABILIZED WITH ARYL-AMINOSULPHONIC ACID/SALT MIXTURES
Sydney Horrobin, Manchester, England, assignor to Imperial Chemical Industries Limited, London, England, a corporation of Great Britain
No Drawing. Filed July 31, 1958, Ser. No. 752,194
Claims priority, application Great Britain Aug. 7, 1957
6 Claims. (Cl. 260—153)

This invention relates to a new process for improving the manufacture and stability of triazinyl halides.

It is known that compounds containing a s-triazin-2-yl group substituted by two halogen atoms in the triazinyl nucleus may be obtained by the reaction of a cyanuric halide with a primary or secondary amine or a compound containing a hydroxyl or mercapto group. When the reaction is carried out in aqueous suspension or solution, it has frequently been found that the desired product is obtained in low yield and poor quality, due to the replacement of halogen attached to the triazine nucleus by hydroxyl both during the reaction period and during the isolation of the product. In addition, even where the reaction and isolation have been carried out in the absence of water, it has been found that, unless stringent precautions are taken to exclude moisture from the stored products, these are unstable and slowly decompose during storage, due to a hydrolysis wherein the halogen attached to the triazine nucleus is replaced by hydroxyl.

It has now been found, however, that the rate of hydrolysis of these compounds containing a dihalogenotriazine group can be markedly reduced, both during manufacture and storage, by the presence of certain buffers which maintain the hydrogen ion concentration at a pH between 3 and 7. The buffers having this valuable property are those obtained from certain N-substituted aminoaryl compounds containing one or more sulphonic acid groups. Whilst those which contain a hydrogen atom or a methyl group attached to the nitrogen atom appear to react with, or to catalyze the hydrolysis of, the triazine compounds, those containing alkyl and aralkyl groups having 2 or more carbon atoms act as stabilisers.

According to the invention there are provided compositions of matter which comprise on the one hand one or more compounds containing at least one 4:6-dihalogeno-s-triazine group and on the other hand a buffer mixture of the free acid and a metal salt of an arylamine-sulphonic acid, each amino group being represented by the formula:

wherein each R may be the same or different and each stands for an alkyl, cycloalkyl or aralkyl group containing at least two carbon atoms, which buffer mixture maintains in aqueous solution a pH of not less than 3 and not more than 7, preferably in the range 4.5 to 6.

The compositions of the invention may be made by simply mixing the buffer mixture with the dry triazine compound, but in general it is preferred to add the buffer mixture during the preparation or isolation of the triazine compound, especially if water be present, so that the compound containing the diahalogeno-s-triazine group is protected from hydrolysis during isolation and drying, and an intimate mixture is obtained.

The compounds containing at least one 4:6-dihalogeno-s-triazine group may be made by known processes, for example by interacting a cyanuric halide with a compound containing a hydroxyl or a mercapto group or with a primary or secondary amine in such proportions and under such conditions that two halogen atoms remain attached to carbon atoms of the triazine nucleus, that is to say, in an inert organic solvent such as acetone or at a relatively low temperature in an aqueous medium.

As examples of cyanuric halides which may be used there may be mentioned cyanuric chloride and cyanuric bromide.

The compounds containing a hydroxyl, mercapto or amino group thus reacted may be colourless when the products will be of use for example, as dyestuff intermediates or textile auxiliary products. As examples of colourless amines there may be mentioned ammonia, methylamine, butylamine, diethylamine, beta-hydroxy-ethylamine, cyclohexylamine, aniline, beta-naphthylamine, metanilic acid, 2-naphthylamine-6-sulphonic acid, 2-naphthylamine-4:8-disulphonic acid, 1-amino-8-naphthol-3:6-disulphonic acid, 2-amino-5-naphthol-7-sulphonic acid, 2-amino-8-naphthol-6-sulphonic acid, p-toluidine, m-anisidine, 2:4-dichloroaniline, ethylene diamine, p-phenylene diamine, 4:4'-diaminostilbene-2:2'-disulphonic acid and 2:4- and 2:5-diaminobenzene sulphonic acids. As examples of alcohols, phenols and mercaptans there may be mentioned methanol, ethanol, iso-propanol, t-butanol, beta-ethoxyethanol, ethylene glycol, phenol, o-, m- and p-cresols, o-chlorophenol, dodecyl mercaptan, beta-hydroxyethyl mercaptan and thiophenol.

Alternatively, the compounds reacted with the cyanuric halide may contain a chromophore when the products may be used as colouring matters, and when soluble in water, are valuable as reactive dyestuffs for cellulose and protein materials. As examples there may be mentioned aminoazo, alkylaminoazo, aminopolyazo, and alkyl-amino polyazo compounds. For example the monoazo compound obtained by coupling diazotised aniline with 1:8-aminonaphthol-3:6-disulphonic acid so that the azo group is attached in the 7-position and the monoazo compound obtained by coupling diazotised metanilic acid with o-anisidine may be reacted with one molecular proportion of cyanuric chloride as described in Examples 1 and 23 of British specification No. 209,723; the copper complex of the monoazo dye obtained by coupling diazotised 2-aminophenol-4-sulphonic acid with 2-amino-5-naphthol-7-sulphonic acid may be reacted with one molecular proportion of cyanuric chloride as described in Example 1 of British specification No. 298,494. There may also be reacted coloured aminoanthraquinone compounds, for example 1-(4'-aminoanilino-)anthraquinone-2:3'-disulphonic acid (as described in British specification No. 467,-815); phthalocyanines containing amine groups attached to the phthalocyanine nucleus either directly or through a linking group, for example as in an aminophenylsulphamyl phthalocyanine (as described in Indian specification No. 59,736); and amino-containing dyestuffs of the nitro series, for example 4-amino-2'-nitrodiphenylamine-3:4'-disulphonic acid (as described in Belgian specification No. 558,390).

Compounds containing more than one s-triazine group may conveniently be obtained by reacting a cyanuric halide with a polyamine, polyhydroxyl or poly-mercapto compound, in the proportion of one molecular equivalent of cyanuric halide for each amino, hydroxyl, or mercapto group present.

The arylaminesulphonic acid used in the buffer mixtures may contain more than one amino group of the above formula. It may contain more than one sulphonic acid group. The sulphonic acid group or groups may be attached to the same aryl nucleus as the amino group, but this is not essential. The sulphonic acid group may, for example, be attached to one of the radicals represented by R in the above formula. Other substituents may be attached to the aryl nucleus, for example chlorine or bromine atoms, alkyl groups for example methyl, and alkoxy groups such as methoxy and ethoxy, nitro groups, carbamyl and sulphamyl groups, carboxylic ester groups, alkyl sulphone and aryl sulphone groups. Substituents may also be present in the phenyl ring of benzyl radicals represented by R in the above formula, whilst alkyl groups represented by R may contain substituents such as hydroxyl, alkoxy or cyano groups. These substituents have little effect on the ability of the arylamine sulphonic acid to stabilise the dihalogeno-s-triazine compounds, provided that the combined effect of such substituents does not cause the arylaminesulphonic acid to have a $pK_a$ value falling outside the range 2.5 to 7.

Suitable arylaminesulphonic acids for use in the compositions of matter include, for example, 4-chloro-N:N-diethylaniline sulphonic acid, N:N-di-n-hexylaniline-m-sulphonic acid, N-ethyl-N-n-hexylaniline disulphonic acid, 2-N:N-diethylaminonaphthalene-6-sulphonic acid, 2-(N-ethyl-N-benzylamino)toluene-4-sulphonic acid, 2-N:N-diethylaminotoluene-4-sulphonic acid, N-ethyl-N-cyclohexylaniline-sulphonic acid, N-ethyl-N- betahydroxyethylaniline sulphonic acid, N-ethyl-N-phenylbenzylamine-monosulphonic acid, 2 - (N - ethyl - N - phenylamino) ethanesulphonic acid, 2-(N-butyl-N-phenylamino) ethane sulphonic acid and 4:4'-bis(diethylamino)diphenyl-2:2'-disulphonic acid. Because of their ease of manufacture and efficiency, the preferred arylamine sulphonic acids are the lower N:N-dialkylderivatives of metanilic acid and sulphanilic acid especially diethylmetanilic acid, diethylsulphanilic acid, or the mixture of the two obtained by the sulphonation of diethylaniline with oleum.

The arylaminesulphonic acid may be mixed with any metal salt thereof, but preferably there is used the salt of a metal of group I or group II of the periodic classification having atomic number between 10 and 21, for example, the calcium or magnesium salt, and above all, the sodium or potassium salt. A convenient means of forming the mixture comprises grinding together the metal salt, for example the sodium salt, of the arylaminesulphonic acid and a solid acid, for example sodium bisulphate.

The buffer mixture may be added to the reaction mixture in which the triazinyl compound is formed either before or during the reaction period, or it may be added after the reaction is complete but before the product is isolated. Where the reaction has been carried out in aqueous suspension or solution, the buffer mixture may be added, either in the solid state or in the form of an aqueous solution. When, during the isolation of the triazinyl compound, a filtration step is included, and the separated solid is then washed on the filter with water or an aqueous solution to remove impurities, the buffer mixture may conveniently be added to or dissolved in the water or aqueous solution used to wash the separated solid.

It is advantageous, when adding the buffer mixture to an aqueous suspension or solution to make the suspension or solution substantially neutral or slightly acid before addition of the buffer mixture.

Preferably, however, the buffer mixture is added to the product in the form of the aqueous press paste after filtration but before drying.

The process of improving the stability of compounds containing a 4:6-dihalogeno-s-triazine group by adding to the said compounds a buffer mixture as defined above forms a further feature of the invention.

Although the addition of even a trace of the buffer mixture gives some improvement in storage stability, it is preferred to add between 1% and 25% based on the weight of triazinyl compound. In practice it is found that the addition of 10% by weight of the buffer mixture, relative to the weight of triazinyl compound present, usually suffices to give adequate storage stability. The invention is, however, not to be understood as restricted to compositions containing at least this amount.

The buffer mixture may be added to the compounds by mixing or milling together the buffer mixture and the compound, which is preferably in the form of the press paste, and if desired there may be added other diluents which give neutral solution in water, for example urea and sodium chloride, as may be used for example in the manufacture of dyestuff compositions of different tinctorial strengths.

The invention is illustrated but not limited by the following examples in which the parts and percentages are by weight:

EXAMPLE 1

This example illustrates the improved storage stability of a dry dyestuff sample containing an arylsulphonic acid buffer mixture chosen in accordance with the invention.

113.8 parts of trisodium 1-amino-4(4'-aminoanilino) anthraquinone-2:3':5-trisulphonate are condensed with 37.8 parts of cyanuric chloride by the method described in Example 1 of United Kingdom specification No. 781,930, and the reaction mixture is filtered.

The moist residue on the filter is drained well and a portion is dried whilst the remainder is mixed with a 4:1 mixture of sodium diethylmetanilate and sodium bisulphate, the amount of mixture used being 10% by weight of the weight of solid material on the filter. The paste so obtained gives a solution having a pH of about 5.5 when dissolved in water. The paste is dried at 45° C.

The products so obtained are tested by determining the percentage by weight of the dyestuff present in the sample which reacts with cellulose fibre under standards conditions. The test is conducted as follows:

1.5 parts of dyestuff are dissolved in 3000 parts of water and 150 parts of sodium chloride are added. The optical absorption curve of this solution is obtained by standard spectrophotometric means.

100 parts of viscose rayon in hank form are then dyed at 20° C. in the solution using the laboratory dyeing machine described in United Kingdom specification No. 624,054. After 30 minutes 6 parts of sodium carbonate are added and dyeing is continued for 90 minutes. The hanks are then removed from the dyebath and scoured in a boiling 0.2% aqueous solution of a non-ionic detergent for 5 minutes, and the dye-liquor and wash-liquor are mixed well and the optional absorption curve is measured. The percentage of dyestuff which has reacted with the cellulose is then calculated by comparing the two absorption curves, making due allowance for the difference in volume.

The products are submitted to an accelerated storage test in glass bottles by heating at 45° C. for 7 days. They are then tested by dyeing in the manner described above. The results obtained are:

| Product | Percent Dyestuff Fixed | | Percent Loss in Fixation on Storage |
|---|---|---|---|
| | (a) Initial | (b) After storage | |
| Unbuffered | 72.1 | 14.1 | 81 |
| Buffered | 78.8 | 78.3 | less than 1 |

EXAMPLE 2

This example illustrates the stabilizing effect of an arylaminesulphonic acid buffer mixture, chosen in accordance with the invention, upon a solution of 2-(m-sulphoanilino)-4:6-dichloro-s-triazine.

6.1 parts of 2-(m-sulphoanilino)-4:6-dichloro-s-triazine are dissolved in 50 parts of water. A further 6.1 parts are dissolved in 50 parts of a buffer solution of pH 5.46 containing 0.754 part of potassium diethylmetanilate and 0.646 part of diethylmetanilic acid. The solutions are stored in a thermostat at 25.0° C. The chlorine ion in each solution is determined at intervals by titration of acidified samples with a standard solution of silver nitrate.

The loss of hydrolysable chlorine is shown in the table:

*Loss of Hydrolysable Chlorine (Percent): 25° C.*

| Time (days) | Water | Buffer Solution |
|---|---|---|
| 1 | 2 | 0.8 |
| 4 | 11 | 2.3 |
| 8 | 36 | 7.6 |
| 11 | 62 | 17 |

EXAMPLE 3

Buffer mixtures are obtained by sulphonating N:N-diethylaniline with oleum whereby there is obtained a mixture of the meta- and para-sulphonic acids. The reaction mixture is drowned into water and treated with lime and a proportion of sodium carbonate insufficient to convert all the sulphonic acids to their sodium salts. The mixture is filtered to remove calcium sulphate, and evaporated to dryness, whereupon there are obtained buffer mixtures whose pH values in aqueous solution range from 4.5 to 6.5 according to the proportion of sodium carbonate used. Two such mixtures are made having pH values of 6.4 and 5.3.

A moist dyestuff filter cake obtained as described in Example 1 is mixed with the buffer mixture in the proportion of 1 part of buffer mixture to 10 parts of solid material in the cake. The pastes are dried at 45° C. and ground. They are tested by dyeing as described in Example 1 and subjected to an accelerated storage test by keeping in sealed glass bottles for 14 days at 45° C.

The following results are obtained:

| Product | Percent Dyestuff Fixed | | Percent Loss in Fixation on Storage |
|---|---|---|---|
| | (a) Initial | (b) After storage | |
| With buffer mixture pH 6.4 | 77.9 | 74.6 | 4 |
| With buffer mixture pH 5.3 | 76.6 | 75.3 | 2 |

EXAMPLE 4

A moist filter cake, obtained as described in Example 1, is mixed with 4-chloro-N:N-diethylaniline sulphonic acid (obtained by sulphonation of 4-chloro-N:N-diethylaniline) together with sufficient sodium bicarbonate to neutralize 80% by weight of the sulphonic acid, in the proportion of 7 parts of the sulphonic acid to 100 parts by weight of solid material on the filter. The buffer mixture of the sulphonic acid and sodium bicarbonate gives, in dilute aqueous solution, a pH value of 5.6. The paste is dried in an oven at 45° C., and ground to a fine powder. A portion of the filter paste without buffer is dried and ground in the same way.

The powders are submitted to an accelerated storage test by heating in sealed glass bottles at 60° C. for 14 days and are tested by dyeing, as described in Example 1.

The following results are obtained:

| Product | Percent Dyestuff Fixed | | Percent Loss in Fixation on Storage |
|---|---|---|---|
| | (a) Initial | (b) After storage | |
| No buffer | 76.5 | 2.3 | 97 |
| Buffered | 76.8 | 66.4 | 14 |

EXAMPLE 5

A buffer mixture is obtained by dissolving N-ethyl-N-phenyl benzylamine monosulphonic acid in water with sufficient sodium hydroxide to give, on dilution, a pH value of 6.0 evaporating, drying and grinding.

A moist dyestuff filter paste, obtained as described in Example 1, is mixed with the buffer mixture in the proportion of 1 part of the buffer mixture to 10 parts of the solid material in the filter paste. The paste is dried at 45° C. and ground to a fine powder. A portion of the filter paste without buffer is dried and ground in the same way.

The powders are submitted to an accelerated storage test by keeping in sealed glass bottles at 60° C. for 14 days, and are then tested by dyeing as described in Example 1. The results are:

| Product | Percent Dyestuff Fixed | | Percent Loss in Fixation on Storage |
|---|---|---|---|
| | (a) Initial | (b) After storage | |
| No buffer | 81.5 | 3.7 | 96 |
| Buffered | 81.6 | 70.5 | 14 |

The N-ethyl-N-phenylbenzylamine monosulphonic acid used in the above example may be obtained by sulphonating N-ethyl-N-phenylbenzylamine as described in the Journal für Praktische Chemie, Volume 76, at page 492.

EXAMPLE 6

Disodium 1-amino-4-(3'-amino)anilinoanthraquinone-2:4'-disulphonate is reacted with an equimolecular proportion of cyanuric chloride and the product is precipitated from solution by addition of salt, filtered and drained well.

A buffer mixture of pH 6.4 is made by mixing together 20 parts of sodium N:N-diethylmetanilate and 1 part of sodium bisulphate. 1 part of this buffer mixture is added for each 10 parts by weight of the dyestuff in the moist filter paste and is dried at 45° C., and ground. A dyestuff similarly prepared but without addition of buffer is dried and ground in the same way. The products so obtained are tested by dyeing as described in Example 1. They are then subjected to an accelerated storage test by keeping in sealed glass bottles at 60° C. for 14 days. The results obtained are:

| Product | Percent Dyestuff Fixed | | Percent Loss in Fixation on Storage |
|---|---|---|---|
| | (a) Initial | (b) After storage | |
| Unbuffered | 51.9 | 5.9 | 89 |
| Buffered | 69.8 | 64.5 | 8 |

EXAMPLE 7

Diazotized orthanilic acid is coupled with 2-acetylamino-5-naphthol-7-sulphonic acid and the product is hydrolysed and reacted with an equimolecular proportion of cyanuric chloride as described in Example 2 of United Kingdom specification No. 785,120. The product is precipitated by addition of salt and filtered.

To the moist residue on the filter containing 10 parts of dyestuff there is added 1 part of a buffer mixture consisting of 0.9 part of sodium N:N-diethylmetanilate and 0.1 part of sodium bisulphate. After intimately mixing, the paste is dried at 60° C. and ground.

A portion of the moist residue on the filter, without added buffer, is dried and ground in the same way.

The buffered powder, on analysis, contains 1.75 equivalents of hydrolysable chlorine per mole of dyestuff, whilst the unbuffered powder contains only 0.3 equivalent.

EXAMPLE 8

Diazotised 1-amino-4-methoxybenzene-2-sulphonic acid is coupled with 2-acetylamino-5-naphthol-7-sulphonic acid, and the product is hydrolysed and reacted with an equimolecular proportion of cyanuric chloride as described in United Kingdom specification No. 785,120. The product is precipitated by addition of salt, and filtered.

To the moist residue on the filter, containing 10 parts of dyestuff, there is added 1 part of a buffer mixture consisting of 0.9 part of sodium N:N-diethylmetanilate and 0.1 part of sodium bisulphate. After mixing, the paste is dried at 45° C. and ground. A portion of the moist residue on the filter, without addition of buffer, is dried and ground in the same way.

The buffered powder, on analysis, contains 1.9 equivalents of hydrolysable chlorine per mole of dyestuff, whilst the unbuffered powder contains only 0.3 equivalent.

The powders are subjected to an accelerated storage test by keeping in sealed glass bottles for 28 days at 45° C. The buffered powder is then found to contain 1.8 equivalents of hydrolysable chlorine per mole, whilst the unbuffered powder contains no hydrolysable chlorine.

EXAMPLE 9

Diazotised 1-amino-4-methoxybenzene-2-sulphonic acid is coupled with 2-acetylmethylamino-8-naphthol-6-sulphonic acid and the resulting azo dyestuff is hydrolysed and reacted with an equimolecular proportion of cyanuric chloride as described in Belgian Patent No. 560,839. The product is precipitated by addition of salt, filtered, washed with 5% salt solution, dried at room temperature, and ground.

To an aqueous solution of the disulphonic acid prepared by the sulphonation of N-ethyl-N-n-hexylaniline there is added sufficient sodium carbonate to neutralise 1.8 equivalents per mole. The solution is evaporated to dryness, dried at 130° C., and ground. This buffer mixture, in dilute aqueous solution, has a pH value of 5.4.

3 parts of the buffer mixture and 25 parts of the dyestuff powder are intimately ground together. The mixture is subjected to an accelerated storage test by keeping in a stoppered glass tube at 60° C. for six days, alongside a similar tube containing the unbuffered dyestuff powder. After this time the unbuffered powder smells strongly of hydrogen chloride whilst the buffered powder does not. On analysis, the unbuffered powder is found to have lost 52% of its original content of hydrolysable chlorine whilst the buffered powder has lost 8%.

EXAMPLE 10

Diazotised 6-chloro-2-aminophenol-4-sulphonic acid is coupled with 1:8-aminonaphthol-3:6-disulphonic acid, and treated with copper sulphate in acetic acid. The resultant copper-containing dyestuff is reacted with an equimolecular proportion of cyanuric chloride. The product is precipitated by addition of salt, filtered, washed with brine and with acetone, dried at room temperature and ground.

A buffer mixture is prepared by addition of sufficient sulphuric acid to an aqueous solution of potassium 2-N:N-diethylaminonaphthalene-6-sulphonate to convert 20% of the potassium salt to the sulphonic acid, evaporating, drying at 130° C., and grinding. This buffer mixture, in dilute aqueous solution, has a pH of 6.3.

10 parts of the dyestuff powder and 1.5 parts of the buffer powder are intimately mixed by grinding together.

The mixture is placed in a stoppered glass tube in a thermostat at 60° C. for 118 hours, together with a portion of the unbuffered dyestuff powder in a similar tube.

After this time the unbuffered powder smells of hydrochloric acid whilst the buffered powder does not. On analysis the unbuffered powder is found to have lost 79% of its hydrolysable chlorine, whilst the buffered powder has lost only 7%.

The potassium 2-N:N-diethylaminonaphthalene-6-sulphonate used in the above example may be obtained by treatment of potassium 2 - naphthylamine - 6 - sulphonate with diethyl sulphate.

EXAMPLE 11

The sodium salt of dichlorotriazinylmetanilic acid is prepared in known manner by reaction of equimolecular proportions of sodium metanilate and cyanuric chloride in aqueous medium, precipitation by addition of salt, filtration, drying in vacuo at room temperature, and grinding.

(a) 10 parts of the product are mixed into a uniform paste with 20 parts of water.

(b) 10 parts of the product are similarly mixed into a uniform paste with 20 parts of water containing 1.2 parts of 2-N:N-diethylaminotoluene-4-sulphonic acid and sufficient sodium hydroxide to convert it to a mixture of 20% acid and 80% sodium salt. The buffer mixture alone, in dilute aqueous solution has a pH of 7.0.

(c) A paste is prepared in the same proportions in which the buffer is 2-(N-ethyl-N-benzylamino)toluene-4-sulphonic acid similarly neutralised to the extent of 80%. The buffer mixture alone, in dilute aqueous solution, has a pH of 5.7.

(d) A paste is prepared in the same proportions in which the buffer is N:N-di-n-hexyl-metanilic acid similarly neutralised to the extent of 80%. The buffer mixture alone, in dilute aqueous solution, has a pH of 5.0.

The four pastes are dried together in vacuo over caustic potash at room temperature, ground to fine powders, and analysed for hydrolysable chlorine.

Portions of each are heated at 60° C. in stoppered glass tubes for 24 hours. The unbuffered powder then smells strongly of hydrogen chloride whilst the others do not. On analysis, the unbuffered powder is found to have lost 42% of its hydrolysable chlorine, whilst all the buffered powders have lost less than 1%.

EXAMPLE 12

The sodium salt of dichlorotriazinylmetanilic acid is prepared as described in Example 11.

Portions of the powder are mixed into uniform pastes with (a) twice its weight of water; (b) twice its weight of water containing 12.5 parts of N-ethyl-N-cyclohexylanine sulphonic acid (obtained by sulphonation of N-ethyl-N-cyclohexylaniline) for each 100 parts of the dry powder, together with sufficient sodium hydroxide to neutralise 80% of the sulphonic acid (giving a pH value of 6.6); (c) twice its weight of water containing 12.5 parts of 2-(N-ethyl-N-phenylamino)ethane sulphonic acid for each 100 parts of the dry powder together with sufficient sodium hydroxide to neutralise 80% of the sulphonic acid (giving a pH value of 5.4).

The pastes are dried in vacuo over caustic potash at room temperature, and ground to fine powders.

The powders are analysed for hydrolysable chlorine, and portions are stored in stoppered glass tubes for 72 hours at 60° C. The unbuffered powder then smells strongly of hydrogen chloride, and on analysis is found to have lost 64% of its hydrolysable chlorine. The buffered powders do not smell of hydrogen chloride and have lost only 2.8% and 1.4% respectively of their hydrolysable chlorine.

EXAMPLE 13

The sodium salt of dichlorotriazinylmetanilic acid is prepared as in Example 11.

Portions of the powder are mixed into uniform pastes with (a) twice its weight of water; (b) twice its weight of water containing 12 parts of N-ethyl-N-beta-hydroxyethylaniline sulphonic acid (obtained by sulphonating N-ethyl-N-hydroxyethylaniline and then hydrolysing the o-sulphate ester obtained) for each 100 parts of the dry powder, together with sufficient sodium hydroxide to neutralise 80% of the sulphonic acid, this buffer mixture alone giving a pH value of 5.1 in dilute aqueous solution, (c) twice its weight of water containing 12 parts of the sodium salt of 2-(N-n-butyl-N-phenylamino)ethane sulphonic acid for each 100 parts of the dry powder, together with sufficient sulphuric acid to convert 42% of the sodium salt to the sulphonic acid, this buffer mixture alone giving a pH value of 4.9 in dilute aqueous solution.

The pastes are dried together in vacuo over caustic potash at room temperature and ground to fine powders.

The powders are analysed for hydrolysable chlorine, and portions are stored in stoppered glass tubes for 72 hours at 60° C. The unbuffered powder then smells strongly of hydrogen chloride and on analysis is found to have lost 71% of its hydrolysable chlorine. The buffered powders do not smell of hydrogen chloride and have lost only 1.6% and 2.0% respectively of their hydrolysable chlorine.

What I claim is:

1. In composition of matter consisting essentially of s-Triazine compound substituted at each of the 4- and 6- positions by halogen atom
    selected from the group consisting of chlorine and bromine
and at the 2- position by substituent selected from the group consisting of amino, mercapto, and oxy radicals, carrying a chromophoric group selected from the class consisting of azo, anthraquinone, phthalocyanine, and nitro chromophoric groups
stabilized by the presence of stabilizing amount of buffer material, the improvement which consists in employing as said buffer
    mixture of the free acid and metal salt of tertiary arylaminosulphonic acid, which mixture maintains in aqueous solution buffered pH range of from about 3 to 7
wherein said arylaminosulphonic acid has the formula

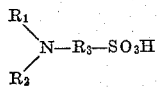

in which
    $R_1$ and $R_2$ are individually selected from the group consisting of lower alkyl having at least two carbon atoms, cyclolower alkyl, monocyclic aryl, and monocyclic aralkyl
and
    $R_3$ is selected from the group consisting of lower alkylene having at least two carbon atoms, and mono- and dicyclic arylene
and the said metal is selected from the group consisting of sodium, magnesium, potassium and calcium.

2. The composition of claim 1, wherein said buffered pH range is from about 4.5 to 6.

3. The composition of claim 1, wherein said arylaminosulphonic acid is 4-chloro-N:N-diethylaniline sulphonic acid.

4. The composition of claim 1, wherein said arylaminosulphonic acid is diethylmetanilate.

5. The composition of claim 1, wherein said mixture is present in amount of between about 1% and 25% by weight of said s-triazine compound.

6. A process for stabilizing s-triazine compound substituted at each of the 4- and 6- positions by halogen atom
    selected from the group consisting of chlorine and bromine
and at the 2-position by substituent
    selected from the group consisting of amino, mercapto, and oxy radicals, carrying a chromophoric group selected from the class consisting of azo, anthraquinone, phthalocyanine, and nitro chromophoric groups
which comprises adding thereto stabilizing amount of mixture of the free acid and metal salt of tertiary arylaminosulphonic acid, which mixture maintains in aqueous solution buffered pH range of from about 3 to 7
wherein said arylaminosulphonic acid has the formula

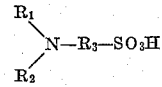

in which
    $R_1$ and $R_2$ are individually selected from the group consisting of lower alkyl having at least two carbon atoms, cyclolower alkyl, monocyclic aryl, and monocyclic aralkyl
and
    $R_3$ is selected from the group consisting of lower alkylene having at least two carbon atoms, and mono- and dicyclic arylene
and the said metal is selected from the group consisting of sodium, magnesium, potassium and calcium.

References Cited in the file of this patent

UNITED STATES PATENTS

| | | |
|---|---|---|
| 2,065,593 | Lubs | Dec. 29, 1936 |
| 2,860,129 | Gunst | Nov. 11, 1958 |
| 2,873,269 | Fasciati et al. | Feb. 10, 1959 |
| 2,892,831 | Stephen | June 30, 1959 |
| 2,907,762 | Heslop | Oct. 6, 1959 |
| 2,951,070 | Stephen et al. | Aug. 30, 1960 |
| 2,951,836 | Stephen | Sept. 6, 1960 |
| 2,953,560 | Baker et al. | Sept. 20, 1960 |
| 2,977,353 | Stephen | Mar. 28, 1961 |

FOREIGN PATENTS

| | | |
|---|---|---|
| 389,098 | Great Britain | Mar. 8, 1933 |
| 842,933 | Great Britain | July 27, 1960 |
| 1,143,177 | France | Apr. 8, 1957 |

OTHER REFERENCES

Chem. Abstracts, Vol. 31, col. 4188 (1937).

Kolthoff et al.: "Acid-Base Indicators," pp. 23 to 24 and 239, The Macmillan Co., New York (1937).

Fierz-David et al.: J. of the Soc. of Dyers and Colourists, Vol. 53, pp. 426–429 and 436 (1937).

Glasstone: Textbook of Physical Chemistry, 2nd Ed., pp. 1006–1008, Van Nostrand Co., Inc. (1946).